(12) United States Patent
Lerman et al.

(10) Patent No.: US 6,996,742 B2
(45) Date of Patent: Feb. 7, 2006

(54) METHOD FOR REGENERATING AND STREAMING CONTENT FROM A VIDEO SERVER USING RAID 5 DATA STRIPING

(75) Inventors: Jesse S. Lerman, New Brunswick, NJ (US); Danny Chin, Princeton Junction, NJ (US); Robert G. Dandrea, Newtown, PA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 504 days.

(21) Appl. No.: 09/996,074

(22) Filed: Nov. 28, 2001

(65) Prior Publication Data

US 2002/0066050 A1 May 30, 2002

Related U.S. Application Data

(60) Provisional application No. 60/253,439, filed on Nov. 28, 2000.

(51) Int. Cl.
*G06F 11/00* (2006.01)
(52) U.S. Cl. ........................................................ 714/6
(58) Field of Classification Search .................... 714/5, 714/6, 54, 50
See application file for complete search history.

(56) References Cited

U.S. PATENT DOCUMENTS

| | | | | |
|---|---|---|---|---|
| 5,581,778 A | | 12/1996 | Chin et al. ................... 395/800 |
| 5,592,612 A | * | 1/1997 | Birk ............................... 714/6 |
| 5,623,595 A | * | 4/1997 | Bailey ........................... 714/6 |
| 5,649,093 A | * | 7/1997 | Hanko et al. .................. 714/6 |
| 5,671,377 A | | 9/1997 | Bleidt et al. ................. 395/328 |
| 5,678,061 A | * | 10/1997 | Mourad ........................ 710/21 |
| 5,727,144 A | * | 3/1998 | Brady et al. ................... 714/6 |
| 5,832,198 A | * | 11/1998 | Lucht ............................. 714/6 |
| 6,079,028 A | * | 6/2000 | Ozden et al. .................. 714/6 |

(Continued)

OTHER PUBLICATIONS

U.S. Appl. No. 09/268,512, filed Mar. 12, 1999, Statistical Disk Scheduling For Video Servers.
U.S. Appl. No. 09/447,472 filed Nov. 23, 1999, Method and Apparatus for Hierarchical Distribution of Video Content for an Interactive Information Distribution System.

(Continued)

*Primary Examiner*—Robert Beausoliel
*Assistant Examiner*—Yolanda L Wilson
(74) *Attorney, Agent, or Firm*—Patterson & Sheridan, LLP

(57) ABSTRACT

A method for streaming content striped in RAID 5 format from an array of disk drives to subscribers to minimize disruptive service from a disk drive failure. The method includes accessing content data on an extent-by-extent basis from a plurality of disk drives in an array and streams the content data to the subscribers on an extent-by-extent basis, sequentially, from the plurality of disk drives. Upon detection of an actual disk drive failure the method transitions to a stream regeneration mode of operation, which includes reading the content data substantially simultaneously from all extents in a parity group and regenerating a failed portion of the content data from a failed extent in the parity group corresponding to the failed disk drive. The content data in the parity group is streamed to the subscribers, extent-by-extent, immediately following the regenerating of the content data from the failed extent in the parity group.

29 Claims, 7 Drawing Sheets

U.S. PATENT DOCUMENTS

| | | |
|---|---|---|
| 6,253,375 B1 | 6/2001 | Gordon et al. .................. 725/88 |
| 6,401,214 B1 * | 6/2002 | Li .................................. 714/6 |
| 6,415,373 B1 * | 7/2002 | Peters et al. ................. 711/167 |
| 6,571,351 B1 * | 5/2003 | Mitaru et al. ................... 714/6 |
| 6,675,318 B1 * | 1/2004 | Lee ................................ 714/6 |
| 2002/0091896 A1 * | 7/2002 | Ishikawa et al. ............ 711/113 |

OTHER PUBLICATIONS

U.S. Appl. No. 09/458,320, filed Dec. 10, 1999, Method and Apparatus for Transferring Data Between Independent Fiber Channel Arbitrated Loops in an Interactive Information Distribution.

* cited by examiner

| D0 | D1 | D2 | D3 | D4 | D5 | D6 | D7 | D8 | D9 | D10 | D11 |
|---|---|---|---|---|---|---|---|---|---|---|---|
| A9 | A10 | A11 | A0 | A1 | A2 | A3 | PAR A0-A3 | A5 | A6 | A7 | PAR A4 A7 |
| PAR B0 B3 | B5 | B6 | PAR A8-A11 | A13 | A14 | A15 | A4 | B0 | B1 | B2 | A8 |
| B4 | | | A12 | PAR B4-B7 | B9 | B10 | PAR A12-A15 | PAR B8-B11 | B13 | B14 | B3 |
| PAR B12-B15 | | | B7 | B8 | | | B11 | B12 | | | B15 |

FIG. 2
(PRIOR ART)

| STRIPE INDEX | DISK 1 | DISK 2 | DISK 3 | DISK 4 | DISK 5 | DISK 6 | DISK 7 | DISK 8 | DISK 9 | DISK 10 | DISK 11 | DISK 12 |
|---|---|---|---|---|---|---|---|---|---|---|---|---|
| 1 | 1 | 2 | 3 | 4 | 5 | 6 | 7 | 8 | 9 | 10 | 11 | 12 |
| 2 | 13 | 14 | 15 | 16 | 17 | 18 | 19 | 20 | P11-20 | S11-20 | P1-10 | S1-10 |
| 3 | 25 | 26 | 27 | 28 | 29 | 30 | P21-30 | S21-30 | 21 | 22 | 23 | 24 |
| 4 | 37 | 38 | 39 | 40 | P31-40 | S31-40 | 31 | 32 | 33 | 34 | 35 | 36 |
| 5 | 49 | 50 | P41-50 | S41-50 | 41 | 42 | 43 | 44 | 45 | 46 | 47 | 48 |
| 6 | P51-60 | S51-60 | 51 | 52 | 53 | 54 | 55 | 56 | 57 | 58 | 59 | 60 |
| 7 | 61 | 62 | 63 | 64 | 65 | 66 | 67 | 68 | 69 | 70 | S61-70 | P61-70 |
| 8 | 73 | 74 | 75 | 76 | 77 | 78 | 79 | 80 | S71-80 | P71-80 | 71 | 72 |
| 9 | 85 | 86 | 87 | 88 | 89 | 90 | S81-90 | P81-90 | 81 | 82 | 83 | 84 |
| 10 | 97 | 98 | 99 | 100 | S91-100 | P91-100 | 91 | 92 | 93 | 94 | 95 | 96 |
| 11 | 109 | 110 | S101-110 | P101-110 | 101 | 102 | 103 | 104 | 105 | 106 | 107 | 108 |
| 12 | S111-120 | P111-120 | 111 | 112 | 113 | 114 | 115 | 116 | 117 | 118 | 119 | 120 |

FIG. 4

METHOD FOR REGENERATING AND STREAMING CONTENT FROM A VIDEO SERVER USING RAID 5 DATA STRIPING

CROSS-REFERENCES

This application claims the benefit of U.S. Provisional Application Ser. No. 60/253,439, filed Nov. 28, 2000, which is herein incorporated by reference in its entirety.

FIELD OF THE INVENTION

This invention generally relates to the field of streaming content from a video server, and more specifically, a method and apparatus for regenerating and streaming content from a redundant array of inexpensive disks (RAID) 5 data striping environment.

BACKGROUND OF THE INVENTION

The principal requirements of a video server are the abilities to store multiple video files, as well as to continually stream any one of these files to any one of a server's multiple clients. A typical large-scale server will hold several hundred video files and be capable of streaming this content to several hundred simultaneous clients. In order for the clients to view the video without interruption, and without a large buffer required at each client site, the server must output each client's stream without interruption. Further, each client must have access to any video file on the server, so that, for example, every client could view the same file simultaneously, or each client could view a different file. Video servers may be capable of "VCR-like" functionality to display a video file in normal, fast-forward, or rewind mode. This functionality generates an additional requirement on the server that a user's viewing mode changes do not incur a long delay, such as, for example, during changes from "normal" mode to "fast-forward" mode.

DIVA Systems, Inc. of Redwood City, Calif. meets these video server requirements using a server design that stripes the multiple video files across an array of hard disk drives (hereinafter "disk drives"). In one type of server configuration, the server streams the video files at multiple constant bitrates (MCBR). Every video file on a MCBR server is streamed out at a constant bitrate, and that bitrate may be different amongst different files on the server. A given video file on a MCBR server is divided into constant sized segments called "extents," with all the data in a given extent written contiguously on one hard disk in the server's disk drive array. The amount of time it takes to output one extent of a video file is called the "service period." Since each extent in a given video file is the same size, and since the file is output at a constant bitrate, that service period is the same for each extent of a given video file. Accordingly, one design for a MCBR server makes the service period the same for each of the server's files. As such, if file A is illustratively output at twice the bitrate of file B, then file A's extent size is twice the size of file B's.

In order to allow any (or all) of the server's clients to view a given video file at the same time, the extents are striped across the server's disk drive array. For example, if the disk drive array has D disk drives numbered 0 through D-1, and a given video file on the server has N extents numbered 0 through N-1. Then, if extent 0 is stored on disk drive J, extent 1 will be stored on disk drive J+1 (modulo D), and extent 2 will be on disk drive J+2 (modulo D), and so on. In this manner a client viewing the file is logically "walked" around the disk drive array, reading one or a few extents at a time, outputting those extents, and then reading more. All supported users on a given server may view the same file because the file is not isolated on any one disk drive. Further, the server can support multiple clients viewing different files of different bitrates because all the clients "walk" around the disk drive array at the same rate and in sync, since the service period is the same for all of the server's files. Because disk drives occasionally fail, the data striping generally uses some form of RAID parity protection, so that the data of the failed disk drive can be regenerated if a single disk drive fails.

FIG. 1 depicts a disk drive array 100 having data striped in a RAID-3 format. Specifically, the top row of boxes represents each disk drive 102 in the array of disks (e.g., 15 disk drives D0 through D14). Furthermore, each box below each disk drive in the array of disks represents an extent of data $110_1$ though $110_p$ (collectively extents 110). FIG. 1 illustratively shows two files, file A and file B, each 16 extents long, striped across a disk drive array consisting of fifteen disk drives total. The disk drive array 100 is illustratively broken into three parity groups $104_1$ through $104_3$ (collectively parity groups 104) of five disk drives each, with each parity group 104 respectively consisting of four data disk drives $106_1$ through $106_3$ (collectively data disk drives 106) and one parity disk drive $108_1$ through $108_3$ (collectively parity disk drive 108). For example, the first parity group 104 comprises the first four extents of file A (i.e., extents A0–A3) illustratively written onto disk drives D5–8, plus the parity extent (i.e., the byte-by-byte XOR of these 4 data extents) written onto disk drive D9. In RAID 3, all files on the server use the same sized parity groups, so that certain disk drives in the array contain only parity data. In FIG. 1, the disk drives containing only parity data are disk drives 4, 9, and 14.

Reads from the RAID 3 formatted disk drive array 100 can proceed according to two different modes of operation. In a first mode of operation, a server must provide realtime correction of a failed extent read attempt without any delay. In this instance, all 5 extents in a parity group need to be read simultaneously. That is, all of the extents 110 in a parity group 104 must be read simultaneously so that a parity correction (i.e., using an XOR Boolean logic operative) can be performed immediately if any one of the 4 data extents 106 is unsuccessfully read.

In a second mode of operation, the server uses the parity data only for regeneration of data in the advent of a failed disk drive. As such, the extents 110 can be read sequentially one-by-one, with extent "1" read one service period after extent "0", and extent "2" read one service period after extent "1" and so forth, and with the parity extents 104 not read at all in normal operation.

One problem with the realtime correction mode of operation is that the parity data 108 is read from the disk drive array 100 even when the disk drive array has no failed disk drive and is experiencing no disk drive errors in general. As such, the wasted disk drive-to-server bandwidth reading the parity disk drive adds to the cost for the ability to perform immediate correction of any failed read attempt.

Another problem associated with realtime parity correction is related to the amount of buffer memory on the server. In particular, the server must hold about twice as much memory as required for reading extents sequentially as compared to a RAID 5 format. This large memory capacity in the server is required in order to hold a full parity group's worth of user data at a time, rather than just 1–2 extents. Alternately, the extent size could be decreased by about 50%, which would keep the total amount of server memory the same. However, reducing the extent size drastically impairs the efficiency of extracting data from the hard disk drives. Therefore, the price in terms of buffer memory and unused disk drive bandwidth in realtime parity correction in a RAID 3 format is substantial. Moreover, in either real-time or non-real-time modes during normal operation under the RAID 3 format, the dedicated parity disk drive does not provide useful bandwidth with respect to streaming data.

FIG. 2 illustratively depicts a disk drive array 200 having data striped in a RAID 5 format. Specifically, FIG. 2 shows the same two files "A" and "B" of FIG. 1 striped across a disk drive array 200 consisting of 12 disk drives (recall that in the RAID 3 example, 15 disk drives were illustratively used). The parity group 104 is the same size as in FIG. 1 (1 parity extent 108 for four data extents 106). For example, the first parity group 104 for the file "A" comprises data extents A0–A3 106 plus the single parity extent 108.

One distinction between the RAID 5 format of FIG. 2 and the RAID 3 format of FIG. 1 is that the RAID 5 format does not use dedicated parity disk drives. Referring to FIG. 1, every file in the RAID 3 system had to start on either disk drive 0, 5 or 10 in order to keep the parity groups aligned. In a RAID 5 system, however, a file can have its first extent on any disk drive in the array so that the parity groups 104 do not align between different files. In fact, the parity data 106 must be evenly distributed across all disk drives in the array for the RAID 5 system to perform properly. For example, in FIG. 2, the data extents A0–A3 104 are stored on disk drives D3–D6, and the corresponding parity extent 108 is stored on disk drive D7. The next parity group 104 (i.e., extents A4–A7) begins on the disk drive (i.e., D7) following the last disk drive of the previous data extents (i.e., disk drive D6). As such, each successive disk drive stores at least one extent of data 106, and may store a parity extent 108 as well.

The advantages of RAID 5 over RAID 3 are twofold: First, for a given amount of server buffer memory, larger extents can be used compared to the real-time RAID 3 mode, thereby allowing data to be extracted more efficiently off each hard disk drive. This follows since the data reads can proceed by a single extent at a time, rather than a full parity group at a time. The second advantage is with regard to disk drive-to-server bandwidth efficiency. In particular, the D disk drives in a RAID 5 array provide D disk drives worth of true (non-parity) data bandwidth. By contrast, the D disk drives in a RAID 3 array provide only $D*P/(P+1)$ disk drives worth of true data bandwidth, where P is the number of data extents in a parity group (e.g., P=4 in FIGS. 1 and 2). Thus, in a RAID 3 format, one disk drive out of each P+1 does not deliver true data.

One problem in a RAID 5 implementation is that there is no dedicated parity drive for real-time recovery when a disk fails. Thus the stream capacity will be reduced in the failure case. Also, in a RAID 5 implementation, the buffer is typically optimized for the normal case for practical reasons including cost. Thus there is a need in the art for handling disk failures in a video server implementing RAID 5 striping so as to maximize the number of streams supported during a disk failure given practical resource limitations.

SUMMARY OF INVENTION

The disadvantages discussed above are overcome and additional features are disclosed by a method for streaming content striped in RAID 5 format from an array of disk drives to a plurality of subscribers to minimize disruptive service from a disk drive failure. The method includes accessing content data on an extent-by-extent basis from a plurality of disk drives in an array and streaming the content data to the plurality of subscribers on an extent-by-extent basis, sequentially, from the plurality of disk drives.

Upon detection of an actual disk drive failure the method transitions to a stream regeneration mode of operation, which includes reading the content data substantially simultaneously from all extents in a parity group and regenerating a failed portion of the content data from a failed extent in the parity group corresponding to the failed disk drive. The content data in the parity group is streamed to the subscribers, extent-by-extent, immediately following the regenerating of the content data from the failed extent in the parity group.

In another embodiment where a spare extent is provided in each parity group, the recovered content data from the parity group is written to a spare extent in the parity group as a low priority task, in the background to streaming the recovered content to the plurality of subscribers. Once the recovered content data is written to all the spare extents, the content data, including the regenerated content data of each parity group, is streamed psuedo-sequentially, extent-by-extent, to the plurality of subscribers, where the regenerated content data in the spare extent of the parity group is streamed out of sequence. Once the failed disk drive is replaced, the regenerated content data is written from the spare extents on the non-failed disk drives of the disk drive array to the replacement disk drive. The content data is sequentially accessed, in a RAID 5 format, and then streamed, extent-by-extent, sequentially to the plurality of subscribers.

In yet another embodiment where a spare extent is provided in each parity group, the disk drives are monitored to predict a disk drive failure. In this instance, the data content on the disk drive that is predicted to fail may be written, as a low priority task in the background of streaming the recovered data content, to spare extents on non-failed disk drives prior to actual failure. Once the disk drive predicted to fail actually fails or is replaced, the content data, including the regenerated content data of each parity group, is streamed, as a high priority task psuedo-sequentially, extent-by-extent, to the plurality of subscribers, where the regenerated content data in the spare extent of the parity group is streamed out of sequence to the subscribers. After replacement of the failed disk drive, the regenerated content data is written, as a low priority task, from the spare extents on the non-failed disk drives of the disk drive array to the replacement disk drive. Once the data contents of the failed disk drive have been written to the replacement disk drive, the content data is sequentially accessed, in a RAID 5 format, and then streamed, extent-by-extent, sequentially to the plurality of subscribers.

BRIEF DESCRIPTION OF THE DRAWINGS

FIG. 2 depicts a disk drive array having data striped in a RAID 5 format;

FIG. 4 depicts RAID 5 data striping across a disk drive array using distributed parity and spare extents;

To facilitate understanding, identical reference numerals have been used, where possible, to designate identical elements that are common to the figures.

DETAILED DESCRIPTION OF THE INVENTION

The disadvantages of the RAID 3 and RAID 5 data striping formats are overcome, and synergistic benefits are achieved by implementing various modes of operation by using a "stream regeneration" algorithm, a "data regeneration" algorithm, and a "recovery carousel-serving" algorithm, which together combine the advantageous features of both RAID 3 and RAID 5 disk drive accessing formats when a disk drive in a RAID 5 array of disks fails. Once a stream server initiates these algorithms, disk drive failures are masked from the perspective of subscribers receiving streamed content by continuing to serve content in a reduced stream capacity mode.

The invention is illustratively depicted and discussed in terms of an interactive video-on-demand (VOD) distribution system. One such VOD distribution system includes the DVS-5000 digital video server system manufactured by DIVA Systems, Inc. of Redwood City, Calif. However, such interactive VOD distribution system should not be considered as limiting. Rather, the stream recovery mode algorithm may be implemented on any information distribution system utilizing an array of disk drives (e.g., audio distribution systems), where files of information are stored in a RAID 5 format and each file may be simultaneously distributed (e.g., streamed) to a plurality of users or subscribers. The term "content" is defined as the movies, trailers, pictures, audio/video information, and/or any other information available to a subscriber. The term "data" refers to the content as distributed across the extents of the disk drives in a disk drive array.

Figure 3:
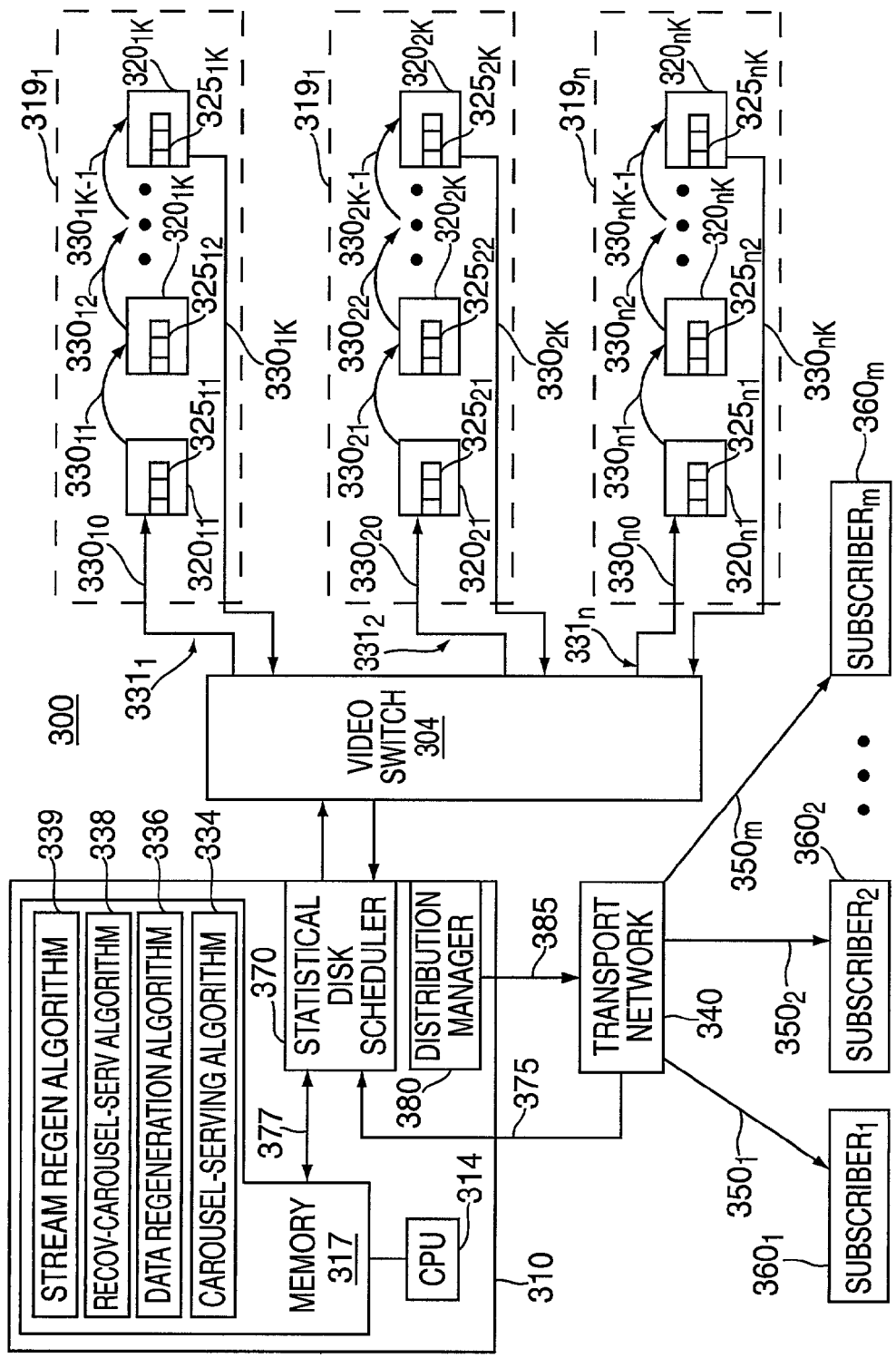
FIG. 3 depicts an illustrative interactive VOD distribution system 300 of the present invention.

FIG. 3 depicts an illustrative interactive VOD distribution system 300 incorporating the teachings of the present invention. Specifically, the illustrative VOD distribution system 300 contains a video server 310 that communicates with one or more disk drive arrays $319_1$ through $319_n$ (collectively disk drive arrays 319) via a video switch 304 (e.g., an MPEG transport packet switch, ATM switch, and the like). Each disk drive array 319 contains a plurality of disk drives $320_1$ through $320_k$ (collectively disk drives 320), where k is an integer, coupled serially in a data transfer loop 331 to a controller (not shown) to form a "loop server". For example, disk drive array $319_1$ is formed by data transfer loop $331_1$, which contains disk drives $320_{11}$ through $320_{1k}$, where the first subscript integer identifies the disk drive array 319 and the second subscript integer identifies the disk drive 320 in the disk drive array 319. One illustrative embodiment of a modular loop server is the DVS-5000 server, manufactured by DIVA Systems, Inc. of Redwood City, Calif.

The video server 310 contains a Statistical Disk Scheduler (SDS) 370, a central processing unit (CPU) 314, and memory element 317. The SDS 370 is coupled to the plurality of disk drives (hereinafter "disk drives") 320 in each disk array 319 by paths $330_0$ through $330_k$ (collectively paths 330) (e.g., fiber-channel), and to the memory 317 by data path 377. The video server 310 sends access requests to a particular disk drive array 319 (loop server) through the video switch 304 and along paths 330 to disk drives 320, where each disk drive 320 has its own internal queue $325_1$ through $325_k$ (collectively queues 325) for buffering the access requests. Data read from the disk drives 320 is transmitted back to the video server 110 along paths 330. The paths 330 are serially coupled (e.g., "daisy chained") to form the loop 331 (e.g., a fiber-channel loop). Preferably, the system 300 employs multiple loops 331 to interconnect the disk drives 320 in the disk drive arrays 319 (loop server), such that the data transfer rate amongst the disk drives 320 and the video server 310 is increased over that of the single loop system 331. For a detailed understanding of an exemplary method for transferring data between independent fiber channel loops in an interactive information distribution system, the reader is directed to commonly assigned U.S. Pat. No. 6,766,393, which is incorporated herein by reference in its entirety.

In one embodiment, an SDS Selection Procedure is utilized to select requests from the three SDS queues (not shown) and forward the requests to an associated disk drive queue $325_n$ located within each of the disk drives $320_n$. The three SDS queues may include a Steady-State queue (SSQ), a non-steady-state queue (NSQ), and an optional other request queue (ORQ). The SDS Selection Procedure uses worst-case access times, request priorities, and time deadlines in determining which request to forward to the disk drive queue. The general strategy of the SDS Selection Procedure is to select a NSQ request only when such a selection will not cause any of the SSQ requests to miss their time deadlines, even if the NSQ request and all requests in the SSQ were to take their worst-case access times. If such a guarantee cannot be made, then the first request in the SSQ is always selected. For a detailed understanding of an exemplary statistical disk scheduler and the SDS queues, the reader is directed to commonly assigned U.S. Pat. No. 6,378,036, which is incorporated herein by reference in its entirety.

The video server contains a Distribution Manager 380, which receives the data transmitted along paths 330 and loop 331 and distributes this data to subscribers $360_1$ through $360_m$ (collectively subscribers 360) via a transport network 340. The transport network 340 is typically, but not exclusively, a conventional bi-directional hybrid fiber-coaxial cable network. Subscribers 160 are coupled to the transport network 340 by paths $350_1$ through $350_m$ (collectively transport network paths 350) (e.g., coaxial cable). Additionally, the transport network 340 forwards subscriber access requests along path 375 to the SDS 370, and receives video data from Distribution Manager 380 via path 385.

Three server algorithms define how the server 310 accesses the disk drives 320 and then streams the content to the subscribers 360. The server algorithms include a carousel-serving algorithm 334, a recovery carousel-streaming algorithm 338, and a stream regeneration algorithm 339, which are illustratively stored in the memory 317 of the server 310. A fourth algorithm, the data regeneration algorithm 336, defines how the server 310 accesses the disk drives 320 for rebuilding data onto a replacement drive. It should be noted that streaming of content to the subscribers is considered a high priority task, while data rebuilding is considered a lower priority task, which may be performed in the background of streaming content, depending on the available disk drive bandwidth. The carousel-serving algorithm 334 is utilized in a normal mode of operation, where no disk drive failure has occurred. The server 310 initiates the data regeneration algorithm 336, the stream regeneration algorithm 339, and/or the recovery carousel-streaming algorithm 338 upon detecting or sensing a disk drive failure. These four server algorithms are discussed in further detail below.

Commonly assigned U.S. Pat. No. 6,253,375, issued Jun. 26, 2001, which is incorporated herein by reference in its entirety, describes an information distribution system known as the ONSET™ system that uses a video server that may benefit from the present invention. Additionally, the video server of the ONSET™ system is described in U.S. Pat. Nos. 5,671,377 and 5,581,778, which are each herein incorporated by reference in their respective entireties.

FIG. 4 depicts RAID 5 data striping across a disk drive array 319 using distributed spare extents. Each disk drive array 319 comprises a plurality of disk drives 320 coupled to together in a loop 331 as discussed with regard to FIG. 3. In the embodiment shown, 12 disk drives 320 form the disk drive array 319. The disk drives 320 are subdivided into equally distributed extents 402. The extents store data (e.g., video content) and parity information. Parity groups 404 are illustratively formed across each of the 12 disk drives 320 in the disk drive array 319, by 10 contiguous data extents, followed by a parity extent 408 and a spare extent 410. In the exemplary embodiment shown, a first stripe formed across the disk drive array 319, which is denoted by a vertical stripe index 406 (e.g., stripe index 1), has data striped across the first extent of disk drives 1 through 10. Parity information for the 10 data extents is provided in the first extent of disk drive 11. Furthermore, the first extent of disk drive 12 is used as a spare extent for that particular parity group. Thus, each parity group 404 illustratively comprises 10 data extents, 1 parity extent, and 1 spare extent.

Figure 1:
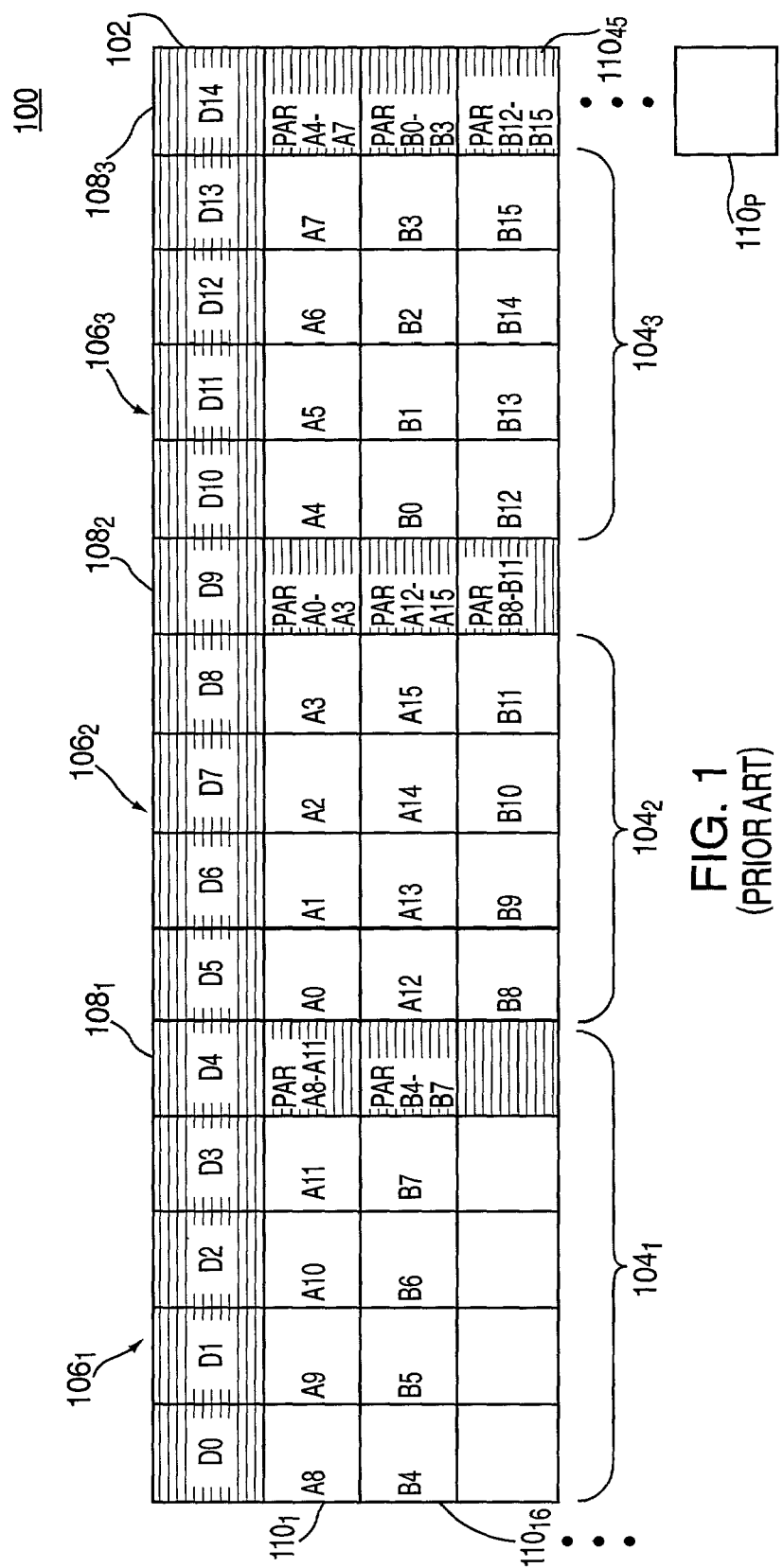
FIG. 1 depicts a disk drive array having data striped in a RAID 3 format.

The parity groups 404 are striped across the disk drive array 319 such that data extents 402, the parity extents 408, and spare extents 410 are spatially located across all of the disk drives 320 in the disk drive array 319. For example, the ninth parity group (stripe index 9) includes data extents 402 striped across disk drives 9–12 and 1–6, the corresponding parity extent 408 formed in disk drive 7, and the corresponding spare extent 410 formed in disk drive 8. Thus, in the RAID 5 format, the "pure parity" disk drives required for RAID 3 (see FIG. 1) are eliminated from the disk drive array 319.

In the interactive information stream server 310, the content (e.g., video, audio, control, and other information) is organized as files comprising, e.g., video, audio, and auxiliary information, which are striped across the disk drive arrays 319 as discussed above with regard to FIG. 4. Referring to FIG. 4, for example, file "A" may be distributed across the disk drives 320 of the stripe index numbers 1–4. File "B" may be distributed in the extents of stripe index number 5, file "C" may be distributed in the extents of stripe index number 6–10, and so forth.

During normal mode of operation, the files containing, for example, video content (and related audio content), are streamed to the subscribers 360. The data extents 402 corresponding to the files to be streamed are sequentially accessed across each disk drive 320 and copied (written) to a buffer (not shown) for subsequent transport (streaming). Under the normal mode of server operation (i.e., no disk drive failures occurring) the "carousel-serving" algorithm 334 controls the sequential accessing of the disk drives 320 around the loop 331. In particular, one or more users (subscribers) access a particular file by accessing each successive extent on each successive disk drive sequentially, extent by extent. That is, only the data extents are read in a parity group 404, while the parity extent 408 containing the parity information and spare extent 410 are not read. The extents 402 in the disk drives 302 are accessed in accordance with the carousel-serving algorithm 334, where the users (i.e., subscribers) "walk around" the disk drive array 319 reading one extent at a time (as in RAID 5 format). Recall, that in the RAID 3 format, all the extents of a parity group 404 are typically read and copied to a buffer at the same time, and then streamed extent-by extent. In the RAID 3 format where the extents are read sequentially, the dedicated parity drive is wasted in the normal case.

RAID 5 striping in conjunction with the carousel-serving algorithm allows reading from 1 disk at a time such that larger extents may be utilized than in the RAID 3 striping format with real-time parity correction. For example, one version of the DVS-5000 server has an extent size per disk drive of 864 KB. By comparison, a previous DVS-4000 server system (also manufactured by DIVA Systems, Inc.), which utilizes the RAID 3 striping format, has an extent size of 329 KB per disk drive. Larger extents are more bandwidth efficient, and reading from each disk drive at a time (as opposed to an entire parity group) allows for improved statistical disk scheduling, compared to reading a disk group and requiring all accesses before parity can be calculated if necessary.

Where a disk drive 320 has failed, the server 310 transitions from the carousel-serving algorithm 334 to the stream regeneration algorithm 339. The basic concept underlying the stream regeneration algorithm 339 is to switch from the RAID 5 format of reading each extent 402 one at a time, to the RAID 3-like format of reading the entire parity group simultaneously. In particular, the bad (i.e., failed) disk drive is no longer accessed, however, all the extents across the other disk drives 320 are read in the parity group 404. The parity information 410 is then used to reconstruct (regenerate) the missing true data from the defective disk drive. From this point on, realtime parity correction can be performed to correct failed reads from the defective disk drive. Furthermore, rebuilding of the data on the disk drive array 319 can proceed as well. Specifically, the data regeneration algorithm 336 executes a disk drive rebuild, and in one embodiment the lost data is written in the spare extents 410 on the disk drives 320 in a disk drive array 319 as a low priority task, as discussed below. Once all the data is written to the spare extents, the server 310 can transition to the recovery-carousel-serving algorithm 338 to stream the contents to the subscribers 360.

In one embodiment, the server 310 is provided with program code (not shown), which monitors the performance of each disk drive 320 of the disk drive arrays 319. The monitoring is performed to detect possible or imminent disk drive failures. The program code provides a system administrator with performance data, such that any disk drive 320 that is deemed bad, that is, "predicted" to fail, may be replaced prior to such failure. Such performance data may include a sufficiently high frequency of failed read attempts, a control signal produced by a disk failing, a thermal profile, disk drive manufacturer detection software, disk access times exceeding a predetermined threshold value, and the like. Once a threshold number of, for example, bad disk drive reads is surpassed, the server 310 declares the suspect disk drive 320 as being "bad" or degraded. The prediction of a disk drive failure permits the server 310 to rebuild the potentially lost data from the predicted failed disk drive to the spare extents, as a low priority task and in the background of streaming data content, prior to the disk drive actually failing. In a second embodiment, the server 310 simply monitors disk drive performance to identify actual disk drive failures, as opposed to possible failures.

In the embodiment shown in FIG. 4, spare extents 410 are distributed across the disk drives 320 in the disk drive array 319. Alternatively, the RAID 5 striping may be provided across the disk drives 320 of the array 319 without dedicating spare extents 410 in a parity group 404. In any of the embodiments (i.e., predictive or non-predictive disk failures, with/without spare extents), the stream regeneration algorithm, data regeneration algorithm, and recovery carousel-serving algorithm may be utilized, either singularly or in combination, to stream content to subscribers and rebuild lost data in the event a disk drive 320 fails, as is discussed in detail below with regard to the embodiments of FIGS. 5 through 7.

Figure 5:
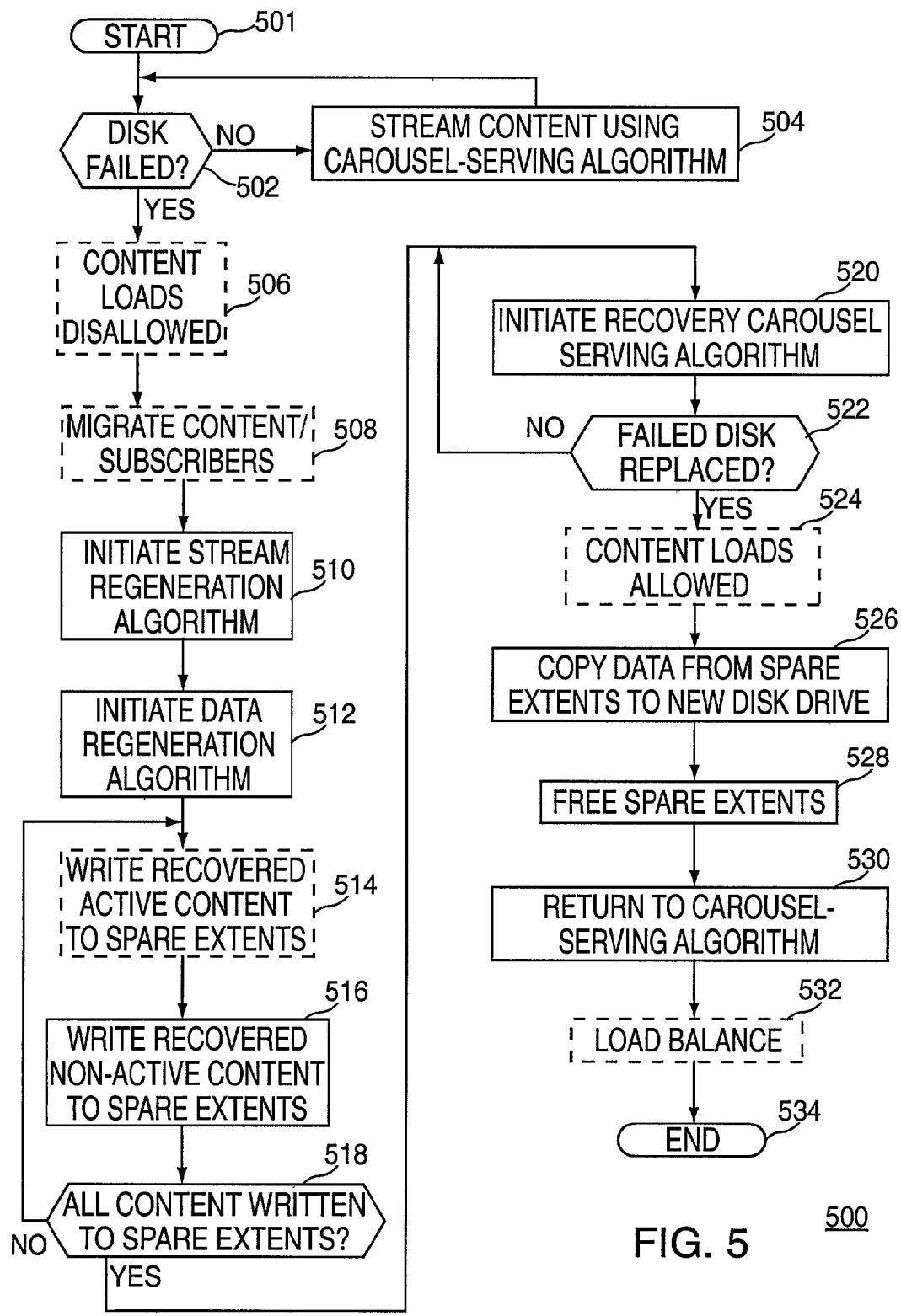
FIG. 5 depicts a flow diagram of a first embodiment of a method of transitioning between a normal carousel-serving mode of operation and a recovery carousel-serving mode of operation during a non-predicted disk drive failure of a disk drive array having spare extents.

FIG. 5 depicts a flow diagram of a first embodiment of a method 500 of transitioning between the normal mode of operation using the carousel-serving algorithm 334, and the disk drive failure mode of operation using the data regeneration algorithm 336 and the recovery carousel-serving algorithm 338. The first embodiment of the method 500 is utilized in an instance where the server 310 does not have predictive disk drive failure capabilities for the disk drive array 319 and where the parity groups 404 in the disk drive array 319 include spare extents 410.

The method 500 starts at step 501, where the server is streaming content (e.g., audio/visual content) to a plurality of subscribers 360 under a normal mode of operation using the carousel-serving algorithm 334. Specifically, the server 310 streams the video content, extent-by-extent, around the loop 331 of disk drives 320 to subscribers requesting such content as described above using the RAID 5 format. Additionally, the server 310 continuously monitors the disk drives 320 in each disk drive array 319 to detect an actual disk drive failure.

At step 502 (drawn in phantam), a determination is made as to whether a disk drive 320 has failed. If, at step 502, the determination by the server 310 is answered negatively, then the method 500 proceeds to step 504, where the server 310 continues to operate in the normal mode of operation using the carousel-serving algorithm 334 and continues to monitor for disk drive failures. If, however, at step 502, the determination by the server 310 is answered positively, then the method 500 optionally proceeds to step 506 (drawn in phantom).

At optional step 506, content loads onto a failed disk drive 320 of a disk drive array 319 are normally disallowed. Although a disk drive 320 may have failed in a disk drive array, in some instances content (e.g., movies, trailers, and/or any other type of content) may still be loaded onto the operable disk drives in the failed disk drive array 319. In particular, the server 310 calculates the parity data for the data to be loaded from the parity extents of the drive. As such, the parity data for the additionally loaded data is available and may be used to regenerate data onto a replacement disk drive at a later time. Such instances where additional content loads may be performed occur when there are only a few disk drive arrays 319 coupled to a server 310, there is a high demand for some particular content (e.g., a new movie), and replacement of the failed disk drive may not occur within an acceptable time period. However, in most instances, high demand content is distributed (e.g., load balanced) amongst numerous disk drive arrays 319 (i.e., loop servers) to accommodate subscribers requesting particular high demand content. Furthermore, disallowing content loads during the failed disk drive mode of operation reduces the overall bandwidth requirements, thereby increasing available bandwidth for higher priority tasks, such as streaming content to subscribers or disk rebuilds. As such, optional step 506 is typically implemented to disallow additional content loads onto the failed disk drive array 319.

At optional step 508 (drawn in phantom), some of the subscribers accessing the disk drives 320 in the failed disk drive array 319 are migrated to (and served by) a non-failed disk drive array 319. By migrating some of the subscribers receiving content from the failed disk drive array 319 to another disk drive array, the number of streams generated by the failed disk drive array is reduced. The subscribers remaining on the failed disk drive array 319 are then able to receive increased bandwidth and higher priority for streaming content to help mask the disk drive failure. Additionally, reducing the stream demand on the failed disk drive array increases the bandwidth of the disk drives 320 during the data reconstruction phase of the method 500, as discussed below.

Additionally, content (e.g., movies) may be migrated from the failed disk drive array 319 to other operational disk drive arrays. In particular, popular content and/or unique content on the failed disk drive array is replicated onto another disk drive array to help mask the failure. For a detailed understanding of hierarchal distribution of content, migrating users between disk drive arrays (i.e., loop server), and load balancing, the reader is directed to commonly assigned U.S. patent application Ser. No. 09/447,472, filed Nov. 23, 1999, which is incorporated herein by reference in its entirety. The method 500 then proceeds to step 510.

At step 510, the stream regeneration algorithm 339 is initiated to recover the lost data on the failed disk drive 320 and stream active content to the subscribers. Once the server 319 initiates the stream regeneration algorithm 339, the entire parity group 404 is read and buffered simultaneously, as in a RAID 3 format. That is, the server 319 no longer accesses the data extent-by-extent as in the RAID 5 format. In particular, the user sequentially reads the parity groups (i.e., true data extents and parity extents) from the operable disk drives. The server reconstructs the lost information from the failed disk drive using the XOR logic operatives on the existing data and parity information in the extents of the operable disk drives in the failed parity group.

The stream regeneration algorithm 339 reconstructs "active" content being streamed to subscribers. Active content relates to content (e.g., movies) that is currently being accessed and streamed to one or more subscribers. The reconstructed active content currently being accessed is streamed to subscribers, extent-by-extent from the reconstructed parity groups. Streaming active content to subscribers is given the highest priority by the stream regeneration algorithm 339. The stream regeneration algorithm 336 buffers the entire parity group 404 so that the lost data is recovered, and is streamed "on-the-fly" to the subscribers. That is, the recovered data is streamed immediately after reconstruction to the subscribers without any significant glitch or delay from the provider equipment.

At step 512, the data regeneration algorithm 336 is initiated to rebuild (reconstruct) the lost data onto the spare extents of the non-failed disk drives. The data regeneration algorithm 336 is a low priority task performed in the background to the stream regeneration algorithm 339, when disk drive bandwidth is available and the high priority task of streaming content to subscribers will not be interrupted. At step 514, the recovered active data is optionally written to the spare extents 410 on the operable disk drives 320 if not already previously recovered. The stream regeneration algorithm 336 writes the active data to the spare extents 410, if there is disk drive bandwidth available after streaming the recovered active content to the subscribers. If, in fact, there is no available disk drive bandwidth while streaming the recovered content data, the active content will be written to the spare extents during the rebuild phase of the non-active recovered data at step 516.

At step 516, the data regeneration algorithm 336 writes the non-active recovered data to the spare extents 410 on the operable disk drives. Non-active content defines the remaining content (e.g., movies) that is stored in the extents of the failed disk array 319, but is not being accessed or streamed by any subscribers. Step 516 is also performed in the background as a low priority task. That is, step 516 is performed whenever disk drive bandwidth becomes available and/or will not delay the streaming of active content to the subscribers. At step 518, a determination is made as to whether all of the data has been written to the spare extents 410. Steps 510 through 516 continue until all the lost data on the failed disk drive 320 is recovered and written onto the spare extents 410 distributed across the parity groups 404 on the disk drive array 319.

It should be understood that for those parity groups 404 having the parity extent 408 reside on the failed disk drive 320, reconstruction of the parity information for that particular parity group 404 is performed and written to the spare extent 410. However, for those parity groups 404 having the spare extent 410 reside on the failed disk drive 320, there is no lost data for that particular parity group 404. As such, the data regeneration algorithm 336 ignores any parity group 404 that has not lost data from a failed disk drive 320. Once all the lost data from the failed disk drive has been recovered from the data and parity extents, and then written to the spare extents 410 across the entire disk drive array 319, the method 500 proceeds to step 520.

At step 520, the server 319 initiates a recovery carousel-streaming algorithm 338. The recovery carousel-streaming algorithm 338 is initiated once a rebuild of the lost data is completed onto the spare extents of the non-failed disk drives 320 in the array 319. The recovery carousel-streaming algorithm 338 transitions accessing the disk drives 320 in the failed array 319 from the RAID 3 format of reading the entire parity group 404 under the stream regeneration algorithm 339 back to reading the data extents in a pseudo-RAID 5 format. In particular, the data extents are no longer accessed in sequential order, since the recovered data is now written in the spare extent. For example, referring to FIG. 4, if disk six fails, then the lost data, illustratively, in extent six (stripe index 1) is recovered and written in the spare extent 410 for that parity group 404, that is, extent 12 in disk drive 12. Thus, for a subscriber accessing a file illustratively stored in stripe index 1, the recovery carousel-streaming algorithm 338 sequentially accesses and streams data from extents 1 through 5, then jumps to the spare extent in disk drive 12, then back to sequentially access disk drives 7 through 10. Therefore, under the pseudo-RAID 5 format utilizing the recovery carousel-streaming algorithm 338, the failed disk drive 320 is always ignored. Moreover, the recovered content data of the parity group is streamed "psuedo-sequentially", extent by extent, to the plurality of subscribers, where the recovered content data in the spare extent of the parity group is streamed out of sequence.

Furthermore, the operable disk drives 320 are accessed extent-by-extent as in the RAID 5 format, and in one embodiment using "earliest deadline first" disk scheduling. However, the recovered data in the spare extent 410 of the parity group 404 is read in place of the failed data extent of the parity group. Therefore, sequential accessing of the extents in a parity group 404 does not occur until the failed disk drive is rebuilt and the server 310 transitions back to the normal mode of operation using the carousel-serving algorithm 334. It is noted that when operating under the recovery carousel-serving algorithm 338, it is possible that any one disk drive could require twice as many reads in one service period. As such, the disk drive array 319 is limited to 50% streaming capacity in the worst case. The method 500 then proceeds to step 522.

At step 522, a determination is made as to whether the failed disk drive has been replaced (e.g., automatic or manual control signal, detection circuit, and the like). If, at step 522, the determination is answered negatively, then the method 500 proceeds to step 520, where the server 310 continues to operate using the recovery carousel-serving algorithm 338. If, however, at step 522, the determination is answered positively, then the method 500 proceeds to optional step 524. At step 524 (drawn in phantom), content loads are optionally allowed (if previously disallowed in step 506) on the disk drive array 319 having the newly installed disk drive 320 therein. In either embodiment where content loads are disallowed (step 506) or allowed (step 524), once the failed disk drive has been replaced, the method 500 proceeds to step 526.

At step 526, the recovered data written to the spare extents is copied to the corresponding data or parity extents in the parity groups on the newly installed disk drive 320. Step 526 is a low priority task and as such, is performed in the background of the higher priority tasks of streaming content to subscribers. In step 528, the spare extents 410 are free to be used as spare extents once again since the recovered data therein is no longer required.

At step 530, the server 310 transitions back to the normal mode of operation using the carousel-serving algorithm 334. That is, the server no longer operates using the pseudo-RAID 5 format under the recovery carousel-serving algorithm 336, but switches back to the normal RAID 5 format of accessing data. As such, the server 310 is capable of supporting 100% of the stream capacity. The method 500 then proceeds to step 532.

At step 532, the server 310 optionally load balances the streams and content on the disk drive arrays. Recall, that in optional step 508, some of the user streams were migrated to other disk drive arrays 319. As such, the post disk drive failure demand for content and subscriber capacity on the rebuilt disk drive array has changed. Load balancing provides a convenient technique of redistributing the demand for streamed content among multiple disk drive arrays 319, thereby distributing the available bandwidth to the subscribers as required. Additionally, step 532 provides an opportunity to load content from other arrays or content libraries, if not already done so, for example, in step 524. The method 500 then proceeds to step 534 where the method 500 ends.

It is noted that one advantage of transitioning to the stream regeneration algorithm 339 and recovery carousel-serving algorithm 338 during the failed disk drive mode of operation is multiple streams of content may be streamed to a plurality of subscribers without any apparent glitch or latency as seen from the perspective of the subscribers. Another advantage is that the spare extents provide an immediate solution for storing the lost data from a failed disk drive, such that the failed disk drive may be casually replaced and rebuilt in the background (e.g., during off-peak hours), that is, when the subscriber demand for content is lower than normal. Furthermore, by utilizing the failed recovery carousel-streaming algorithm 338, at least 50% of the original stream capacity can be maintained per service period, as opposed to a RAID 3 format, which typically would support less than 50% of the original stream capacity due to buffer limits when reading an entire parity group per user.

Figure 6:
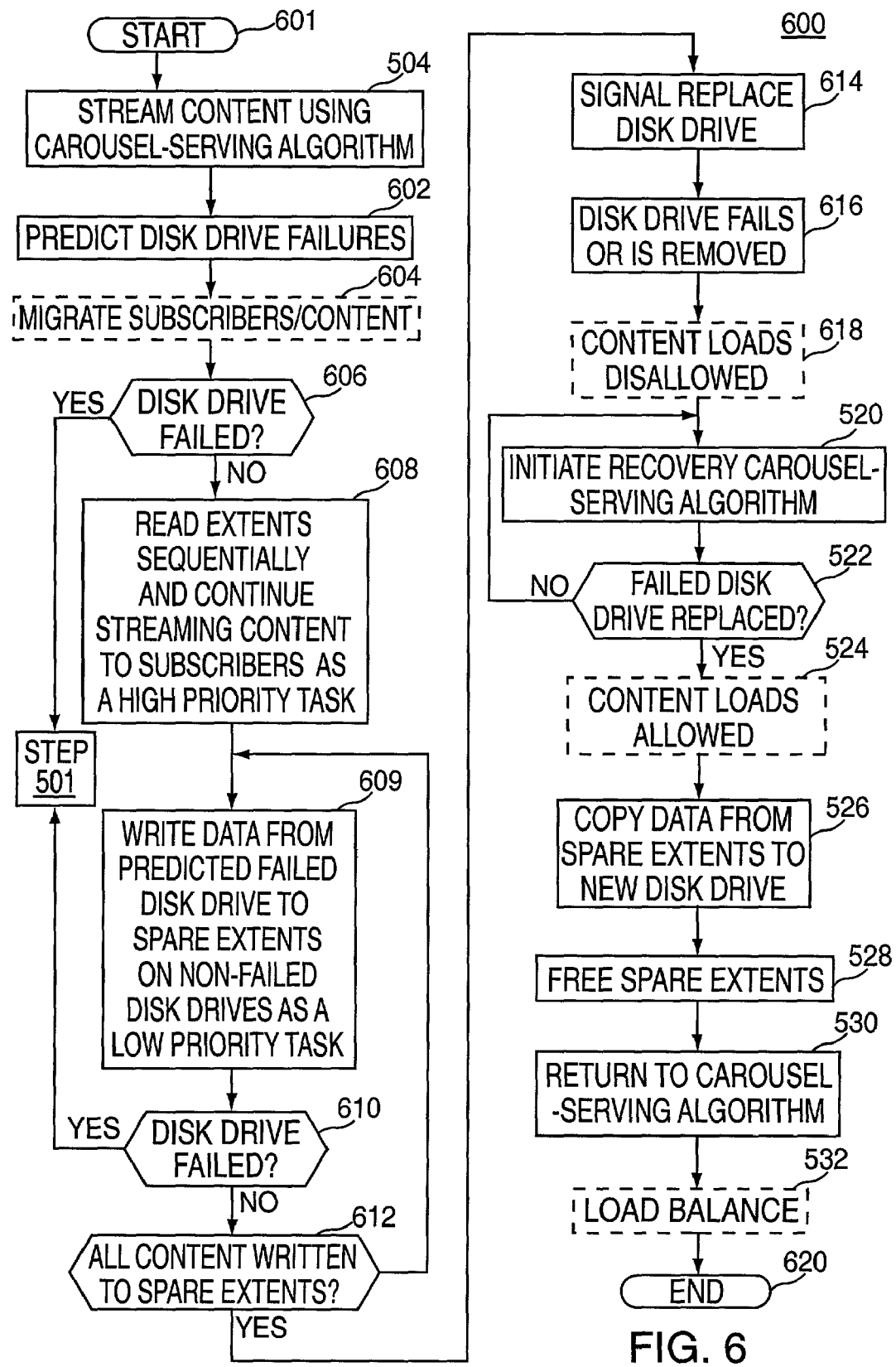
FIG. 6 depicts a flow diagram illustrating a method of transitioning between a normal carousel-serving mode of operation and a recovery carousel-serving mode of operation during a predicted disk drive failure of a disk drive array having spare extents.

FIG. 6 depicts a flow diagram of a second embodiment of a method 600 of transitioning between the normal mode of operation using the carousel-serving algorithm 334, and the disk drive failure mode of operation using the data regeneration algorithm 336 and the recovery carousel-serving algorithm 338. The second embodiment of the method 600 is utilized in an instance where, for example, the server 310 has disk drive failure predicting capabilities for the disk drive array 319 and where the parity groups 404 in the disk drive array 319 include spare extents 410.

The method 600 begins at step 601 in a normal disk access mode of operation, where one or more users (i.e., subscribers) access a particular file by accessing each successive extent on each successive disk sequentially, extent by extent. That is, in the normal mode of operation, the clients "walk around" the disk drive array 319 reading one extent at a time (as in RAID 5 format). Thus, for a given amount of buffer memory 317 in the server 310, the extent size can be maximized and the server 310 can utilize the disk drives 320 in the array 319 with maximal bandwidth efficiency. All reads in the normal mode of operation using the carousel-serving algorithm 334 for the RAID 5 format read only the true data (i.e. non-parity) portion of each extent.

At step 602, the server 310 monitors the performance of the disk drives 320 in the array 319 to ensure that the data stored on the disk drives 320 is streamed to the subscribers with minimal interruption. As soon as the server 310 calculates the success rate of a certain disk has deteriorated below a minimum threshold, it declares that disk drive as being defective (i.e., pending failure). It is noted that although a particular disk drive has been declared (i.e., predicted) as a pending failure, the disk drive has not actually failed. The method 600 then proceeds to optional step 604 (drawn in phantom), where the server 310 optionally migrates some or all the users from the failed disk drive array 319 to other operable disk drive arrays as described at step 508 of method 500 above. The method 600 then proceeds to step 606.

At step 606, the server 310 determines if the predicted failed disk drive 320 has actually failed. If the determination at step 606 is answered positively, then the method 600 proceeds to step 501 where the non-predictive failure method 500 (FIG. 5) is initiated. If, however, at step 606, the determination is answered negatively, then the method proceeds to step 608, where the server 310 continues to stream active content in a normal mode of operation using the carousel-serving algorithm 334. In particular, the server 310 streams the active content as a high priority task, sequentially, extent-by-extent, to the plurality of subscribers.

At step 609, the data from the extents in the disk drive predicted to fail is written to the spare extents in the non-failed disk drives. Step 609 is performed as a low priority task when disk drive bandwidth becomes available from the high priority task of streaming content to the subscribers. It should be understood that for those parity groups 404 having the parity extent 408 reside on the failed disk drive 320, reconstruction of the parity information for that particular parity group 404 is performed and written to the spare extent 410. However, for those parity groups 404 having the spare extent 410 reside on the failed disk drive 320, there is no lost data for that particular parity group 404. As such, the data regeneration algorithm ignores any parity group 404 that has not lost data from a failed disk drive 320.

At step 610, the server 310 again determines if the predicted failed disk drive 320 has actually failed. If the determination in step 614 is answered positively, then the method 600 proceeds to step 510 where the non-predictive failure method 500 (FIG. 5) is initiated. It should be noted that the method 600 reverts to step 501 of method 500 at any instance where the disk drive actually fails prior to writing (i.e., rebuilding) all the active and non-active content to the spare extents. If, however, at step 610, the determination is answered negatively, then the method proceeds to step 612. In particular, once the lost content from the failed disk drive has been recovered from the data and parity extents, and then written to the spare extents 410 across the entire disk drive array 319, the method 600 proceeds to step 614. At step 614, a signal is provided to notify a system operator/administrator that the recovered content has been rewritten to all the spare extents 410 and the failed disk drive may be replaced. The failed disk drive may then be casually replaced, illustratively, at off-peak content demand times to minimize glitches to the subscribers.

At step 616, once the predicted failed disk drive has been removed, or actually fails, the method 600 proceeds to optional step 618, where additional content loads are disallowed as discussed with regard to step 506 of method 500. The method 600 then proceeds to steps 520 through 532 as described in detail with regard to method 500 in FIG. 5. At step 620 the method 600 ends.

The predictive disk drive failure capabilities advantageously allow the server 310 to use spare disk bandwidth to perform the $1^{st}$ pass rebuild (i.e., rebuild to spare extents) in the background (i.e., off-peak hours). Since the streams are given highest priority, the server 310 can support 100% of the stream capacity during the first pass rebuild (step 608). Furthermore, multiple streams of content may be streamed to a plurality of subscribers without any significant glitch or latency as seen from the perspective of the subscribers. That is, the failure is masked from the subscribers. Another advantage is that the spare extents provide an immediate solution for storing the predicted lost data from the predicted failed disk drive, such that the predicted failed disk drive may be casually rebuilt as a low priority task, for example, during off-peak hours, when the subscriber demand for content is lower than normal. Moreover, after the rebuilding of the predicted lost data to the spare extents is complete, the predicted failed disk drive may be casually replaced at the convenience of a system operator/administrator. In addition, rebuilding the data onto the spare extents prior to an actual failure allows the server 310 to transition directly to the recovery carousel-serving algorithm. Transitioning to the recovery carousel-serving algorithm generally supports more streams than streaming recovered content "on-the-fly" under a RAID 3 format as discussed at step 512 of method 500. Also, the predictive case does not require parity correction to regenerate data. This saves CPU and/or other resources that are ordinarily required to perform such operations.

Figure 7:
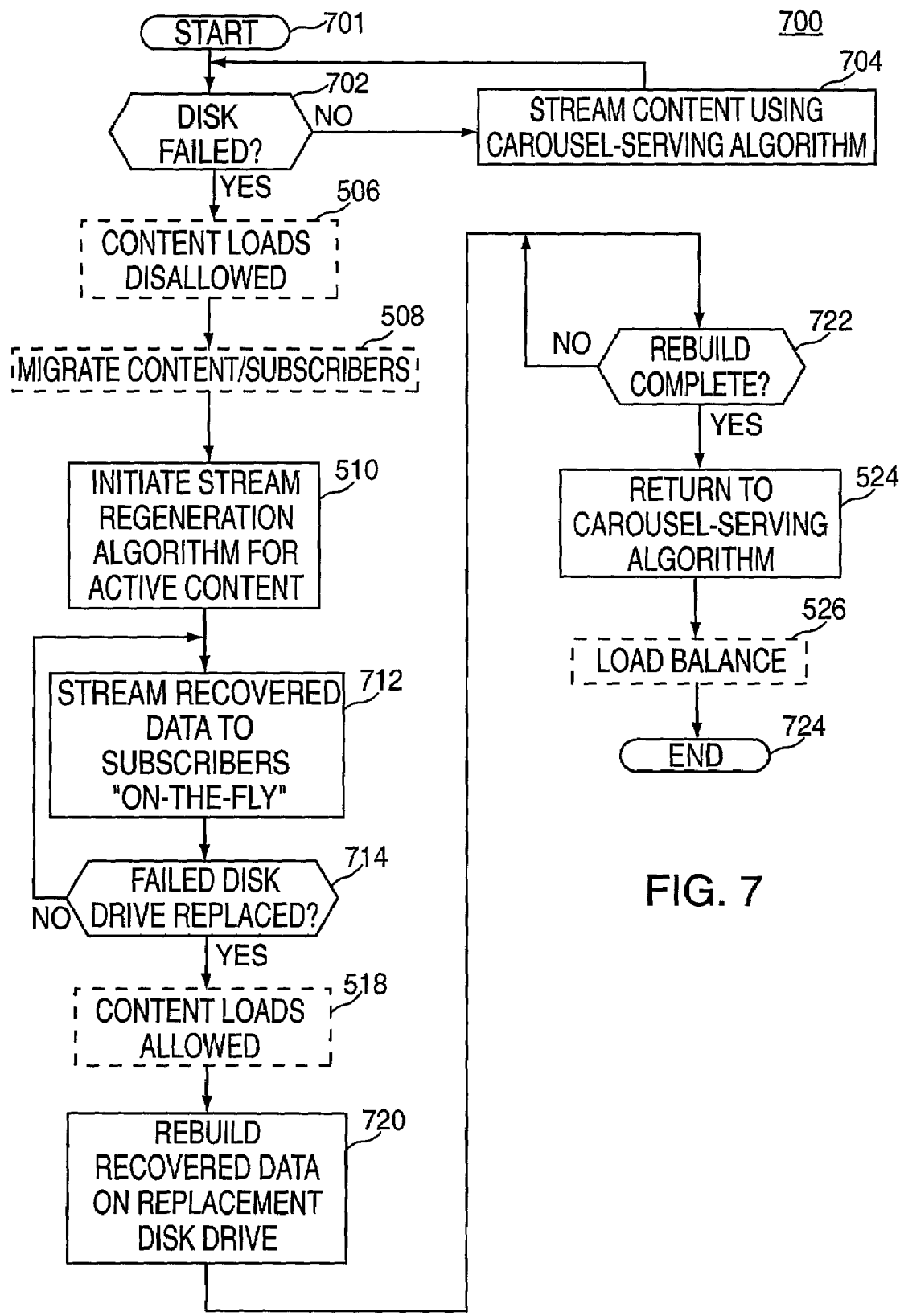
FIG. 7 depicts a flow diagram illustrating a method of transitioning between a normal carousel-serving mode of operation and a recovery carousel-serving mode of operation during a non-predicted disk drive failure of a disk drive array without spare extents.

FIG. 7 depicts a flow diagram of a third embodiment of a method 700 of transitioning between the normal mode of operation using the carousel-serving algorithm 334 and a disk drive failure mode of operation using the stream regeneration algorithm 339. The third embodiment of the method 700 is utilized in an instance where the parity groups 404 in the disk drive array 319 do not include spare extents 410. As such, there is no benefit to predicting the disk drive failures as provided in method 600.

The method 700 begins at step 701 where the server 310 operates in a normal mode using the carousel-serving algorithm. At step 702, the server 310 determines whether a disk drive 320 in a disk drive array 319 has failed. If, at step 702, the determination is answered negatively, then the method 700 proceeds to step 704, where the server 310 continues to operate in the normal mode of operation and monitors for a disk drive failure. If, however, at step 702, the determination is answered positively, then the method proceeds to optional steps 506 and 508 (drawn in phantom) to respectively disallow content loads, and migrate content and/or subscribers, as discussed above with regard to method 500 of FIG. 5. The method 700 then proceeds to step 510.

At step 510, the server initiates the stream regeneration algorithm 339 to recover and stream the data lost in the failed extents of the failed disk drive. Recall that the stream regeneration algorithm 339 buffers the entire parity group 404 so that the lost data is recovered and in step 712 the recovered data is streamed "on-the-fly" to the subscribers. The method 700 continues to recover and stream data on the fly, until, in step 714 the failed disk drive is replaced. Once the failed disk drive is replaced, the method proceeds to optional step 518 (drawn in phantom) where the content loads are allowed, as discussed above with regard to method 500 of FIG. 5. The method 700 then proceeds to step 720.

At step 720, data is recovered, i.e. using the data recovery algorithm 336 as described in step 512 of method 500, and is rebuilt (written) onto the data extents in the replacement disk drive. Furthermore, the parity extents are calculated and written to the corresponding parity extents for a particular parity group. Step 720 is performed as a low priority task, in the background to the high priority task of streaming recovered content to the subscribers. At step 722, once the replacement disk drive is rebuilt with the recovered data and parity, the method 700 proceeds to step 524.

At step 524, the server 310 returns to the normal mode of operation under the carousel-serving algorithm 334, where the server and disk drive array 319 has 100% stream capacity. The method 700 then proceeds to step 526 (drawn in phantom) to optionally load balance the content and/or streams on the disk drive arrays 319, as discussed above with regard to methods 500 and 600 of FIGS. 5 and 6. The method 700 then proceeds to step 724, where the method 700 ends.

There are numerous advantages to transitioning from a RAID 5 format using the carousel-serving algorithm 334 of disk accessing to a RAID 3 format using the stream regeneration algorithm 339. One advantage is that the stream server may stream recovered content "on-the-fly" to the subscribers, thereby masking the disk drive failure from the perspective of such subscribers. Additionally, the stream regeneration algorithm 339 is performed as a high priority task, thereby minimizing any glitches or latency problems that may be observed by the subscribers. Another advantage is that the data regeneration algorithm 336 may be performed in the background to the stream regeneration algorithm 339, as a low priority task, thereby enabling data reconstruction without disruption to streaming content to the subscribers.

Although various embodiments that incorporate the teachings of the present invention have been shown and described in detail herein, those skilled in the art can readily devise many other varied embodiments that still incorporate these teachings.

What is claimed is:

1. A method for streaming content striped in RAID 5 format from an array of disk drives to a plurality of subscribers to minimize disruptive service from a disk drive failure, said method comprising:

accessing content data striped in said RAID 5 format, on an extent-by-extent basis, from a plurality of disk drives configured in an array without reading the parity extents;

streaming the content data to the plurality of subscribers on an extent-by-extent basis, sequentially, from the plurality of disk drives;

detecting an actual disk drive failure; and transitioning to a stream regeneration mode of operation comprising:

reading the content contemporaneously from all extents in a parity group associated with a failed disk drive;

regenerating a failed portion of the content data from a failed extent in the parity group corresponding to the failed disk drive; and streaming the content data in the parity group to the plurality of subscribers, extent-by-extent, immediately following the regenerating of the content data from the failed extent in the parity group.

2. The method of claim 1, further comprising disallowing content loads upon detecting the actual disk drive failure.

3. The method of claim 1, further comprising migrating at least one subscriber to a non-failed disk drive array.

4. The method of claim 1, further comprising migrating content to a non-failed disk drive array.

5. The method of claim 1, further comprising:
sensing installment of a replacement disk drive; and
rebuilding the content data thereon.

6. The method of claim 5, further comprising allowing content loads on the replacement disk drive.

7. The method of claim 6, wherein after said rebuilding step, the method further comprises:

accessing the content data on an extent-by-extent basis from the plurality of disk drives configured in the RAID 5 format; and streaming the content data to the plurality of subscribers on an extent-by-extent basis, sequentially, from the plurality of disk drives.

8. The method of claim 7, further comprising load-balancing the content data between additional disk drive arrays.

9. The method of claim 7, further comprising load-balancing the streams to the plurality of subscribers between additional disk drive arrays.

10. The method of claim 1, wherein the regenerating step further comprises initiating a data regeneration mode of operation comprising writing, as a low priority task, recovered content data to spare extents on non-failed disk drives in the array.

11. The method of claim 10, wherein once the regenerated content data has been written to the spare extents, initiating a recovery-carousel-serving mode of operation comprising streaming psuedo-sequentially, extent-by-extent, content data of each parity group to the plurality of subscribers, here the regenerated content data in a spare extent of each parity group is streamed out of sequence.

12. The method of claim 11, further comprising:
sensing installment of a replacement disk drive; and
writing the regenerated content data from the spare extents on the non-failed disk drives of the array to the replacement disk drive.

13. The method of claim 12, wherein after said writing step, the method further comprises:
accessing content data on an extent-by-extent basis, sequentially, from the plurality of disk drives configured in the RAID 5 format; and
streaming content data to the plurality of subscribers on an extent-by-extent basis, sequentially, from the plurality of disk drives.

14. The method of claim 13, further comprising allowing content loads on the replacement disk drive.

15. The method of claim 14, further comprising load-balancing the content data between additional disk drive arrays.

16. The method of claim 14, further comprising load-balancing the streams to the plurality of subscribers between additional disk drive arrays.

17. A method for streaming content striped in RAID 5 format from an array of disk drives to a plurality of subscribers to minimize disruptive service from a disk drive failure, said method comprising:
accessing content data striped in said RAID 5, on an extent-by-extent basis, from a plurality of disk drives configured in an array without reading the parity extents;
streaming the content data to the plurality of subscribers on an extent-by-extent basis, sequentially, from the plurality of disk drives;
predicting a disk drive failure;
writing content data from a the disk drive predicted to fail to spare extents on non-failed disk drives in the array;
detecting at least one of an actual failure and removal of the disk drive predicted to fail; and
transitioning, in response to the detecting step, a recovery-carousel-serving mode of operation comprising:
streaming psuedo-sequentially, extent-by-extent, content data of each parity group to the plurality of subscribers, where the regenerated content data in a spare extent of each parity group is streamed out of sequence.
wherein in an instance where the disk drive predicted to fail fails prior to said writing step, said method further comprises
transitioning to a stream regeneration mode of operation comprising:
reading the content data contemporaneously from all extents in a parity group;
regenerating a failed portion of the content data from a failed extent in the parity group corresponding to the failed disk drive; and
streaming the content data in the parity group to the plurality of subscribers, extent-by-extent, immediately following the regenerating of the content data from the failed extent in the parity group.

18. The method of claim 17, wherein the detecting step further comprises monitoring disk drive performance data selected from the group consisting of a sufficiently high frequency of failed read attempts, a control signal produced by a disk failing, a thermal profile, a disk drive manufacturer detection software signal, and disk access times exceeding a predetermined threshold value.

19. The method of claim 17, further comprising migrating at least one subscriber to a non-failed disk drive array.

20. The method of claim 17, further comprising migrating content to a non-failed disk drive array.

21. The method of claim 17, further comprising disallowing content loads upon detecting the actual failure of the disk drive predicted to fail.

22. The method of claim 17, further comprising:
sensing installment of a replacement disk drive; and
writing the regenerated content data from the spare extents on the non-failed disk drives of the array to the replacement disk drive.

23. The method of claim 22, wherein after said writing step, the method further comprises:
accessing content data on an extent-by-extent basis, sequentially, from the plurality of disk drives configured in the RAID 5 format; and
streaming content data to the plurality of subscribers on an extent-by-extent basis, sequentially, from the plurality of disk drives.

24. The method of claim 22, further comprising allowing content loads on the replacement disk drive.

25. The method of claim 23, further comprising load-balancing the content data between additional disk drive arrays.

26. The method of claim 23, further comprising load-balancing the streams to the plurality of subscribers between additional disk drive arrays.

27. The method of claim 1, further comprising, forming said disk drives into a plurality of parity groups, each parity group comprising contiguous data extents and a single parity extent striped across said disk drives, wherein said data extents and parity extent of said parity groups are spatially distributed across the disk drives of said array.

28. The method of claim 27, wherein each parity group further comprises a spare extent being spatially distributed across said disk drives of said array.

29. The method of claim 28, further comprising:
striping said data extents contiguously across a first portion of said disk drive of said array;
forming said single parity extent in a disk drive adjacent to said data extents; and
providing said spare extent in a disk drive of said array adjacent to said parity extent.

* * * * *

UNITED STATES PATENT AND TRADEMARK OFFICE
CERTIFICATE OF CORRECTION

PATENT NO. : 6,996,742 B2
DATED : February 7, 2006
INVENTOR(S) : Lerman et al.

It is certified that error appears in the above-identified patent and that said Letters Patent is hereby corrected as shown below:

Column 9,
Line 42, "phantam" should be -- phantom --.

Column 16,
Line 59, "here" should be -- where --.

Column 17,
Line 29, delete "a".

Signed and Sealed this

Second Day of May, 2006

JON W. DUDAS
*Director of the United States Patent and Trademark Office*